(12) United States Patent
Takahashi (10) Patent No.: US 8,054,393 B2
(45) Date of Patent: Nov. 8, 2011

(54) LIQUID CRYSTAL DISPLAY DEVICE

(75) Inventor: Hiroyuki Takahashi, Funabashi (JP)

(73) Assignee: Hitachi Displays, Ltd., Chiba (JP)

( * ) Notice: Subject to any disclaimer, the term of this patent is extended or adjusted under 35 U.S.C. 154(b) by 459 days.

(21) Appl. No.: 12/254,853

(22) Filed: Oct. 21, 2008

(65) Prior Publication Data

US 2009/0109360 A1    Apr. 30, 2009

(30) Foreign Application Priority Data

Oct. 29, 2007   (JP) ................................ 2007-279782

(51) Int. Cl.
*G02F 1/1343*    (2006.01)

(52) U.S. Cl. ......................................... 349/39; 349/129

(58) Field of Classification Search .............. 349/38–39, 349/129
See application file for complete search history.

(56) References Cited

U.S. PATENT DOCUMENTS 7,834,949 B2 * 11/2010 Tasaka et al. ................... 349/48
2006/0197554 A1 * 9/2006 Jinta ................................ 326/81

FOREIGN PATENT DOCUMENTS

JP    2002-278517    9/2002

* cited by examiner

*Primary Examiner* — Eric Wong
(74) *Attorney, Agent, or Firm* — Antonelli, Terry, Stout & Kraus, LLP.

(57) ABSTRACT

The present invention provides a liquid crystal display device used in miniaturized portable equipment which exhibits favorable display quality while decreasing a load applied to a driver circuit which supplies a video signal line to pixel electrodes. In a liquid crystal display device which includes liquid crystal display elements and a liquid crystal driving circuit, a boosting circuit is provided to a pixel portion. The boosting circuit, after writing a video signal in a pixel electrode and one electrode of a boosting capacitance, brings the pixel electrode into a floating state. Then, by applying the video signal to another electrode of the boosting capacitance, a voltage of the pixel electrode is boosted or dropped.

6 Claims, 10 Drawing Sheets

LIQUID CRYSTAL DISPLAY DEVICE

BACKGROUND OF THE INVENTION

1. Field of the Invention

The present invention relates to a liquid crystal display device, and more particularly to a technique which is effectively applicable to the pixel structure of a liquid crystal display device used in a display part of a portable device.

2. Description of the Related Art

A TFT (Thin Film Transistor)-type liquid crystal display device has been popularly used as a display device of a personal computer, a television receiver set or the like. Such a liquid crystal display device includes a liquid crystal display panel and a driver circuit for driving the liquid crystal display panel.

With respect to such a liquid crystal display device, a miniaturized liquid crystal display device has been popularly used as a display device of portable equipment such as a mobile phone. In using the liquid crystal display device as the display device of the portable equipment, such a display device is requested to exhibit low power consumption compared to a conventional liquid crystal display device.

JP-A-2002-278517 discloses a technique which supplies a video signal to a liquid crystal display panel at a low voltage, and controls a pixel potential using a pixel capacitance provided to a pixel. However, JP-A-2002-278517 merely discloses voltage boosting and voltage dropping in response to fixed pixel potential control signals.

SUMMARY OF THE INVENTION

As the display device used in the portable equipment, the liquid crystal display device is requested to satisfy a demand for further reduction of power consumption. In view of the above, a driver circuit which is driven at a low voltage has been developed. Further, a conventional liquid crystal display device has been driven by dot inversion driving in which a common voltage is fixed and polarities of neighboring pixels are inverted from each other, while the liquid crystal display device for portable equipment is driven by so-called common AC driving in which a common voltage is also changed to a polarity side opposite to a voltage applied to a pixel electrode for realizing low voltage driving.

However, along with the realization of higher resolution, there arises a drawback that, in common AC driving, a common voltage is fluctuated corresponding to a magnitude of a voltage written in a pixel electrode or a length of a signal line.

Accordingly, also in the liquid crystal display device for portable equipment, there has been an attempt to change a driving method from common AC driving to dot inversion driving. However, in the dot inversion driving in which polarities of neighboring pixels are inverted from each other, a driver circuit is required to possess a high breakdown strength and hence, the power consumption increases thus making the lowering of power consumption difficult.

The present invention has been made to overcome the above-mentioned drawbacks of the related art, and it is an object of the present invention to provide a liquid crystal display device which exhibits low power consumption with respect to a miniaturized liquid crystal display device.

The above-mentioned and other objects and novel featured of the present invention will become apparent from the description of this specification and attached drawings. To briefly explain the summary of typical inventions among the inventions disclosed in this specification, they are as follows.

A liquid crystal display device includes two substrates, liquid crystal composition which is sandwiched between two substrates, a plurality of pixels which are mounted on the substrate, a pixel electrode which is provided to each pixel, a counter electrode which faces the pixel electrode, a boosting capacitance which includes a first capacitance electrode and a second capacitance electrode electrically connected to the pixel electrode, a first switching element which is configured to supply a video signal to the pixel electrode and the first capacitance electrode in an ON state, a second switching element which is configured to supply a video signal to the second capacitance electrode in an ON state, a video signal line which is configured to supply a video signal to the first switching element and the second switching element, a scanning signal line which is configured to supply a scanning signal for controlling turning on and off of the first switching element, and a boosting scanning signal line which is configured to supply a boosting scanning signal for controlling turning on and off of the second switching element.

The first switching element is brought into an ON state in response to the scanning signal so as to supply the video signal to the pixel electrode and the first capacitance electrode and, subsequently, the first switching element is brought into an OFF state and, thereafter, the second switching element is brought into an ON state so as to supply the video signal to the second capacitance electrode thus boosting or dropping a voltage of the pixel electrode.

The video signal written in the pixel electrode is of a low voltage, and after writing such a video signal in the pixel electrode, the voltage of the pixel electrode can be boosted or dropped using the video signal. Accordingly, by arbitrarily setting the boosting capacitance, it is possible to set the voltage of the pixel electrode fixed times as large as a video signal.

DESCRIPTION OF THE PREFERRED EMBODIMENTS

A liquid crystal display device includes two substrates, liquid crystal composition which is sandwiched between the two substrates, a plurality of pixels which are mounted on the substrate, a pixel electrode which is provided to each pixel, a counter electrode which faces the pixel electrode, a boosting capacitance which includes a first capacitance electrode and the second capacitance electrode electrically connected to the pixel electrode, a first switching element which is configured to supply a video signal to the pixel electrode and the first capacitance electrode in an ON state, a second switching element which is configured to supply a video signal to the second capacitance electrode in an ON state, a video signal line which is configured to supply a video signal to the first switching element and the second switching element, a scanning signal line which is configured to supply a scanning signal for controlling turning on and off of the first switching element, and a boosting scanning signal line which is configured to supply a boosting scanning signal for controlling turning on and off of the second switching element.

The first switching element is brought into an ON state in response to the scanning signal so as to supply the video signal to the pixel electrode and the first capacitance electrode and, subsequently, the first switching element is brought into an OFF state. Thereafter, the second switching element is brought into an ON state so as to supply the video signal to the second capacitance electrode thus boosting or dropping a voltage of the pixel electrode.

Hereinafter, embodiments of the present invention are explained in detail in conjunction with drawings. Here, in all drawings for explaining the embodiments, parts having identical functions are given same symbols, and their repeated explanation is omitted.

Figure 1:
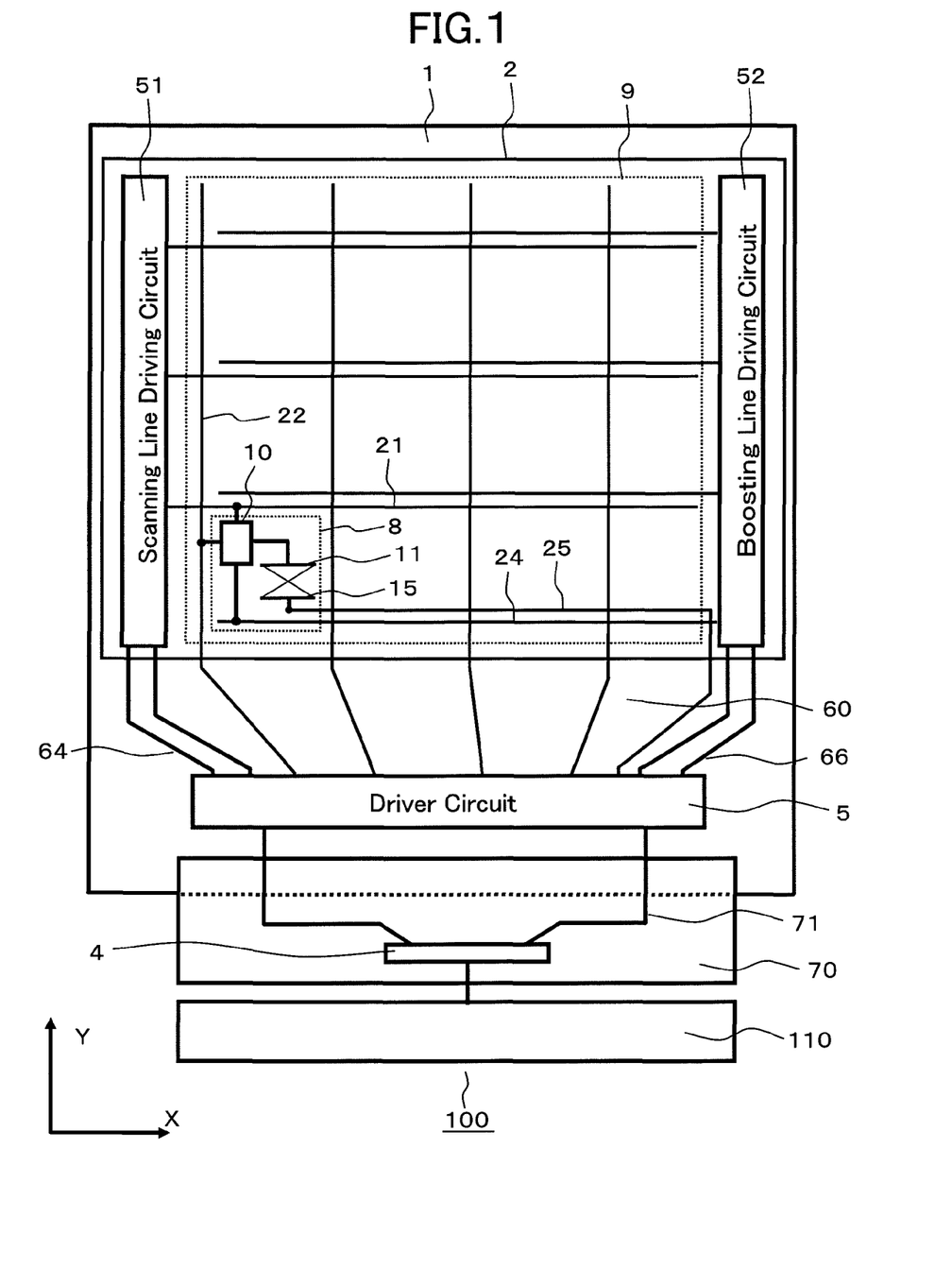
FIG. 1 is a schematic block diagram showing a liquid crystal display device of an embodiment according to the present invention.

FIG. 1 is a block diagram showing the basic constitution of a liquid crystal display device of an embodiment according to the present invention. As shown in FIG. 1, a liquid crystal display device 100 of this embodiment is constituted of a liquid crystal display panel 1, a driver circuit 5, a flexible printed circuit board 70 and a backlight 110.

The liquid crystal display panel 1 is configured as follows. A TFT substrate 2 on which boosting circuits 10, pixel electrodes 11, counter electrodes 15 and a color filter substrate (not shown in the drawing) on which color filters and the like are formed overlap with the TFT substrate 2 with a predetermined gap therebetween. Both substrates are adhered to each other using a frame-shaped sealing material arranged between both substrates and in the vicinity of peripheral portions of the substrates and, at the same time, liquid crystal composition is filled and sealed in the sealing material. Further, a polarizer is adhered to outer surfaces of both substrates.

Here, the embodiment of the present invention is applicable to both of a so-called IPS-method type liquid crystal display panel in which the counter electrodes 15 are arranged on the TFT substrate 2 and a so-called vertical-electric-field method type liquid crystal display panel in which the counter electrodes 15 are arranged on the color filter substrate in the same manner.

On the TFT substrate 2, scanning signal lines (also referred to as gate lines) 21 which extend in the x direction and are arranged parallel to the y direction in the drawing and video signal lines (also referred to as drain signal lines) 22 which extend in the y direction and arranged parallel to the x direction in the drawing are formed, and a pixel portion 8 is formed in each region which is surrounded by the scanning signal lines 21 and the video signal lines 22.

Here, although the liquid crystal display panel 1 includes a large number of pixel portions 8 in a matrix array, for facilitating the understanding of the drawing, only one pixel portion 8 is shown in FIG. 1. The pixel portions 8 arranged in a matrix array form a display region 9, the respective pixel portions 8 play a role of pixels of a display image, and the image is displayed in the display region 9.

The boosting circuit 10 of each pixel portion 8 has one terminal thereof connected to the pixel electrode 11, has another terminal thereof connected to the video signal line 22, and has a control terminal thereof connected to the scanning signal line 21 and a boosting scanning signal line 24. The boosting circuit 10 performs a function of a switch for supplying a video signal to the pixel electrode 11, and a function of generating grayscale voltages by boosting or dropping a video signal. Here, the detail of the boosting circuit 10 is described later.

A driver circuit 5 is arranged on a transparent insulation substrate (glass substrate, resin substrate or the like) which constitutes the TFT substrate 2. The driver circuit 5 is electrically connected to a scanning line driving circuit 51 and a boosting line driving circuit 52.

A flexible printed circuit board 70 is connected to the TFT substrate 2. The flexible printed circuit board 70 includes a connector 4. The connector 4 is connected to an external signal line so as to allow inputting of signals to the flexible printed circuit board 70 from the outside. Lines 71 are provided between the connector 4 and the driver circuit 5, and signals from the outside are inputted to the driver circuit 5 via the lines 71.

The liquid crystal display panel 1 is a non-light emitting element and hence, the liquid crystal display panel 1 requires a light source for displaying images. For this end, the liquid crystal display device 100 includes the backlight 110 and the backlight 110 emits light to the liquid crystal display panel 1. The liquid crystal display panel 1 performs a display by controlling a transmission quantity or a reflection quantity of light radiated from the backlight 110. Here, although the backlight 110 is arranged on a back surface or a front surface of the liquid crystal display panel 1, to facilitate the understanding of the drawing, the backlight 110 is illustrated such that the backlight 110 is juxtaposed to the liquid crystal display panel 1 in FIG. 1.

A control signal transmitted from a control device (not shown in the drawing) arranged outside the liquid crystal display device 100 and a power source voltage supplied from an external power source circuit (not shown in the drawing) are inputted to the driver circuit 5 via the connector 4 and the lines 71.

Signals inputted to the driver circuit 5 from the outside are respective control signals such as a clock signal, a display timing signal, a horizontal synchronizing signal or a vertical synchronizing signal, display-use data (R•G•B) and a display mode control command, and the driver circuit 5 drives the liquid crystal display panel 1 in response to the inputted signals.

The driver circuit 5 is constituted of a 1-chip semiconductor integrated circuit (LSI), outputs a control signal to the scanning line driving circuit 51 via a control signal line 64, and outputs a control signal to the boosting line driving circuit 52 via a control signal line 66. Further, a video signal is outputted to the video signal lines 22.

The scanning line driving circuit 51, in response to a reference clock generated inside the driver circuit 5, every 1 horizontal scanning time, supplies a selection voltage (scanning signal) of "High" level to the respective scanning signal lines 21 of the liquid crystal display panel 1 sequentially for a fixed period. Accordingly, due to the plurality of boosting circuits 10 connected to each scanning signal line 21, the video signal lines 22 and the pixel electrodes 11 become electrically conductive with each other for the fixed period for every 1 horizontal scanning period.

Further, the boosting line driving circuit 52, in response to a reference clock generated inside the driver circuit 5, for every 1 horizontal scanning period, sequentially supplies a selection voltage (boosting scanning signal) of "High" level to boosting scanning signal lines 24 for a fixed period which differs from the fixed period during which the scanning signal is supplied. In accordance with a control in response to the boosting scanning signal, the boosting circuit 10 boosts or drops a voltage of the pixel electrodes 11.

Further, in accordance with display data corresponding to a grayscale to be displayed by the pixel, the driver circuit 5 selects a video signal of an arbitrary voltage, and outputs the video signal to the video signal lines 22. When the video signal is supplied from the driver circuit 5, the video signal is supplied to the pixel electrodes 11 from the video signal line 22 via the boosting circuit 10 in a conductive state in response to the scanning signal. Thereafter, when the boosting circuit 10 is brought into an OFF state, the video signal based on the video data to be displayed by the pixel is held in the pixel electrode 11.

Further, the boosting circuit 10 boosts or drops the voltage held in the pixel electrodes 11 in response to the boosting scanning signal using the video signal, and forms a grayscale voltage to be displayed by the pixel. Since the grayscale voltage can be formed using the video signal based on the display data, it is possible to boost or drop the grayscale voltage such that the grayscale voltage is changed linearly corresponding to the display data.

For example, when the boosting circuit 10 has a twofold boosting ability, it is possible to write the grayscale voltage twice as high as the video signal in the pixel electrode 11. Accordingly, even when forming such as gamma correction is applied to the video signal from the driver circuit 5, the grayscale voltage which follows a waveform change of the video signal outputted from the driver circuit 5 can be written in the pixel electrode.

Figure 2:
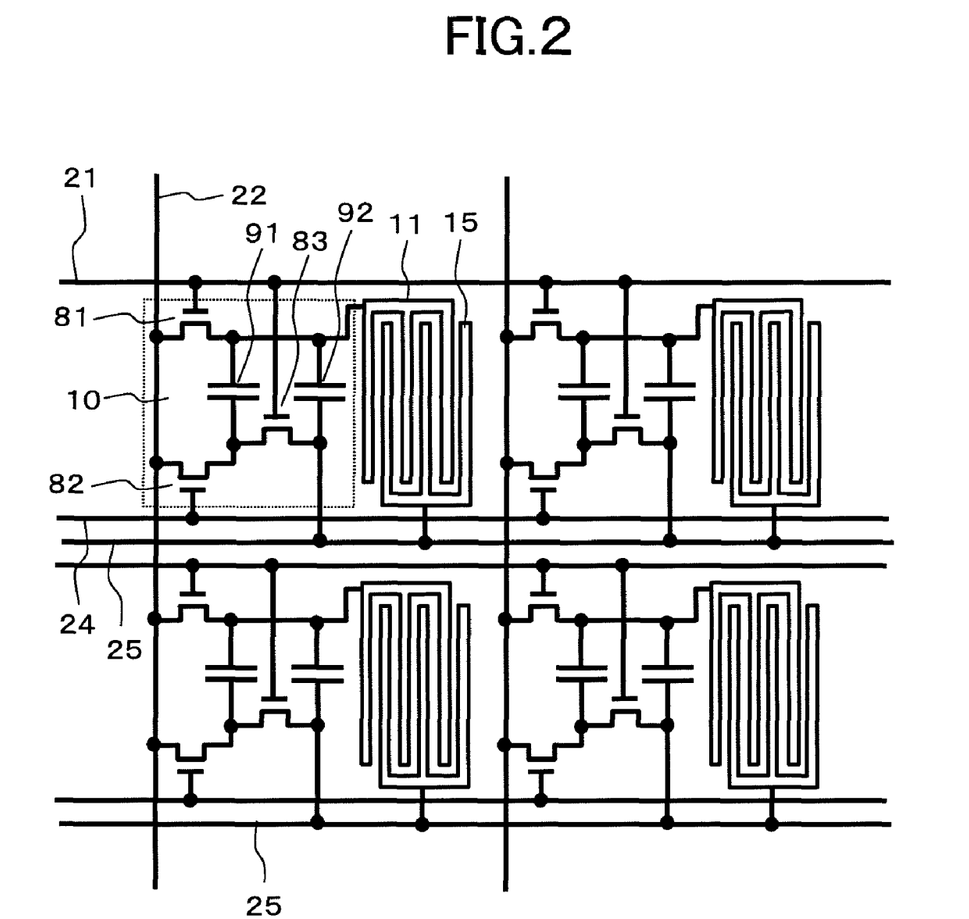
FIG. 2 is a schematic circuit diagram showing pixel portions of the liquid crystal display device of the embodiment according to the present invention.

Next, FIG. 2 is a planar circuit block diagram of the pixel portions 8 of the liquid crystal display device 1. As shown in FIG. 2, the pixel portions 8 are formed on the TFT substrate 2. Each pixel portion 8 is surrounded by the scanning signal line 21, the counter electrode signal line 25 and the video signal lines 22. In FIG. 2, the pixel electrode 11 and the counter electrode 15 of an IPS method are specifically described.

The boosting circuit 10 is formed in the pixel portion 8. The boosting circuit 10 is constituted of a first switching element 81, a second switching element 82, a third switching element 83 and a boosting capacitance 91. Numeral 92 indicates a holding capacitance.

The first switching element 81 has a drain terminal thereof connected to the video signal line 22, has a source terminal thereof connected to the pixel electrode 11 and one terminal of the boosting capacitance 91, and has a control terminal thereof connected to the scanning signal line 21. The second switching element 82 has a drain terminal thereof connected to the video signal line 22, has a source terminal thereof connected to another terminal of the boosting capacitance 91, and has a control terminal thereof connected to the boosting scanning signal line 24.

Here, although naming of "source" and "drain" may be reversed based on the relationship of biases applied to the switching element, in this embodiment, the terminal which is connected to the video signal line 22 is referred to as the drain terminal.

Further, the counter electrode 15 is provided to the pixel portion 8. The pixel electrode 11 and the counter electrode 15 are formed in a comb teeth shape, and the respective electrodes are arranged to face each other alternately. Due to the potential difference between a grayscale voltage supplied to the pixel electrode 11 and a counter voltage supplied to the counter electrode 15, it is possible to control intensity of transmitting light by changing the alignment direction of liquid crystal molecules.

Figure 3:
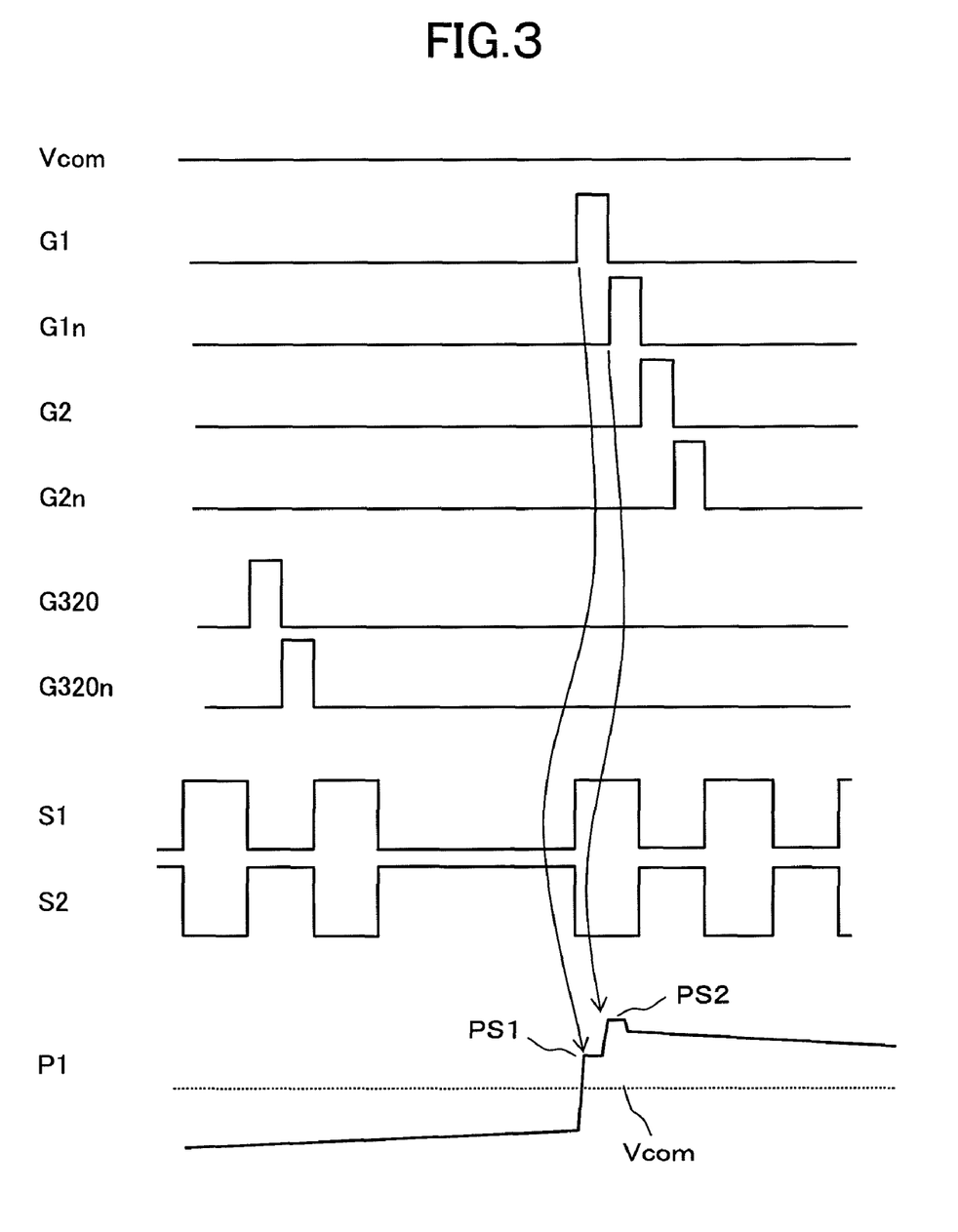
FIG. 3 is a timing chart showing a driving method of the liquid crystal display device of the embodiment according to the present invention.

Next, the manner of operation of the boosting circuit 10 is explained in conjunction with FIG. 3. Symbol Vcom indicates a counter voltage supplied to the counter electrode 15. FIG. 3 shows a case in which the counter voltage Vcom is fixed. However, the present invention is also applicable to so-called Vcom inversion driving in which the counter voltage Vcom has polarity thereof reversed for every 1 frame period or for several horizontal scanning periods for AC driving.

First of all, a scanning signal G1 is outputted to the first line of scanning signal line 21. The first switching elements 81 are brought into an ON state in response to the scanning signal G1, and a video signal S1 supplied via the video signal line 22 is written in the pixel electrode 11. Further, a voltage in accordance with the video signal S1 is held also in one electrode of the boosting capacitance 91.

Here, the third switching element 83 assumes an ON state in response to the scanning signal G1 simultaneously and hence, a counter voltage Vcom supplied from the counter electrode signal line 25 is held in another electrode of the boosting capacitance 91.

Next, after the first switching element 81 and the third switching element 83 assume an OFF state due to finishing of outputting of the scanning signal G1, a boosting scanning signal G1$n$ is supplied from the boosting scanning signal line 24 and hence, the second switching element 82 assumes an ON state whereby the video signal S1 is supplied to another electrode of the boosting capacitance 91.

Since the pixel electrode 11 is in a floating state at this point of time, when the voltage of another electrode of the boosting capacitance 91 is changed in response to the video signal S1, the voltage P1 of the pixel electrode 11 is also influenced so that the voltage P1 is changed.

Assuming the boosting capacitance as Cp and a sum of the pixel capacitance and the holding capacitance as Cstg, the voltage P1 generated in the pixel electrode 11 becomes as $(1+Cp/(Cp+Cstg))$ times as large as the voltage of the video signal S1. For example, when the boosting capacitance Cp and the sum Cstg of the pixel capacitance and the holding capacitance satisfy the relationship of Cp=Cstg, the voltage P1 is 1.5 times as large as the voltage of the video signal S1. Further, when the boosting capacitance Cp and the sum Cstg of the pixel capacitance and the holding capacitance satisfy the relationship of Cp>>Cstg, the voltage P1 is 2 times as large as the voltage of the video signal S1.

At a point of time indicated by PS1 in the drawing, the voltage of the pixel electrode 11 is S1, while at a point of time indicated by PS2 in the drawing, the voltage of the pixel electrode 11 is $(1+Cp/(Cp+Cstg))\times S1$.

Figure 4:
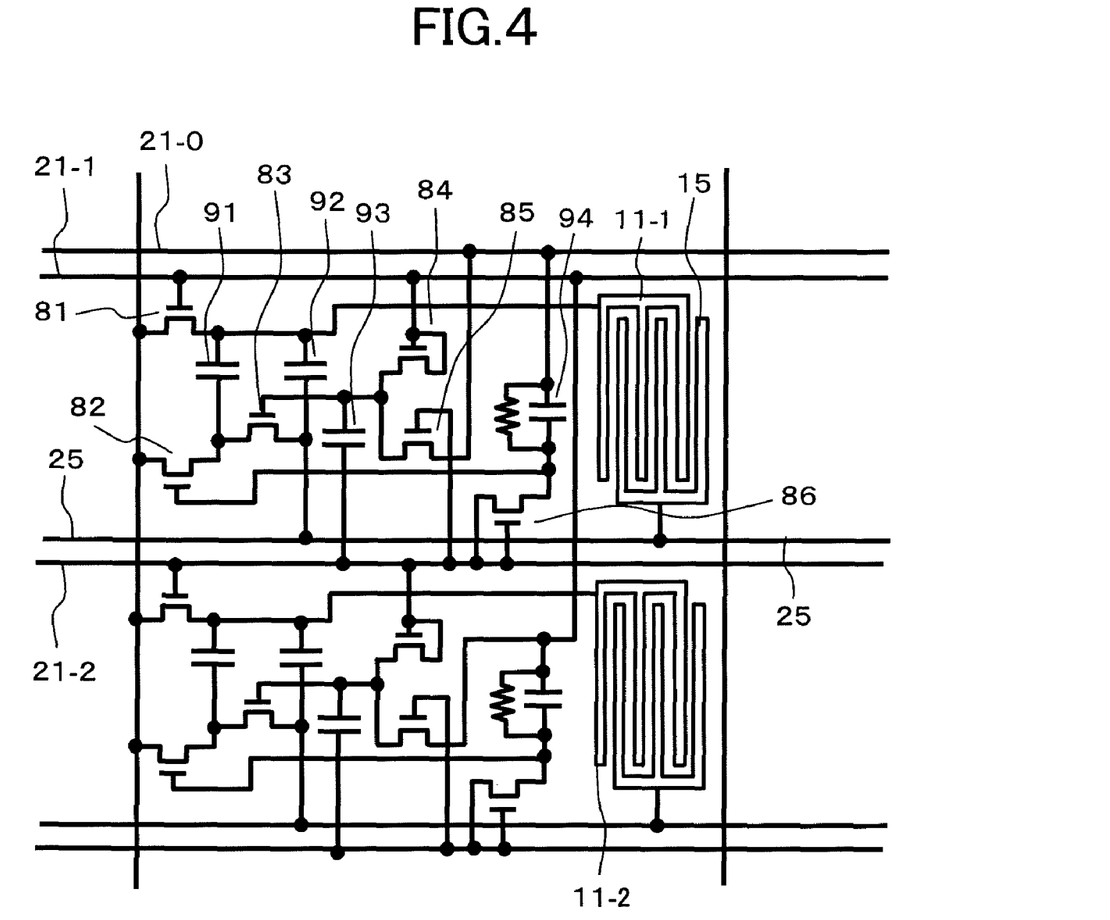
FIG. 4 is a schematic circuit diagram showing the pixel portion of the liquid crystal display device of the embodiment according to the present invention.
Figure 5:
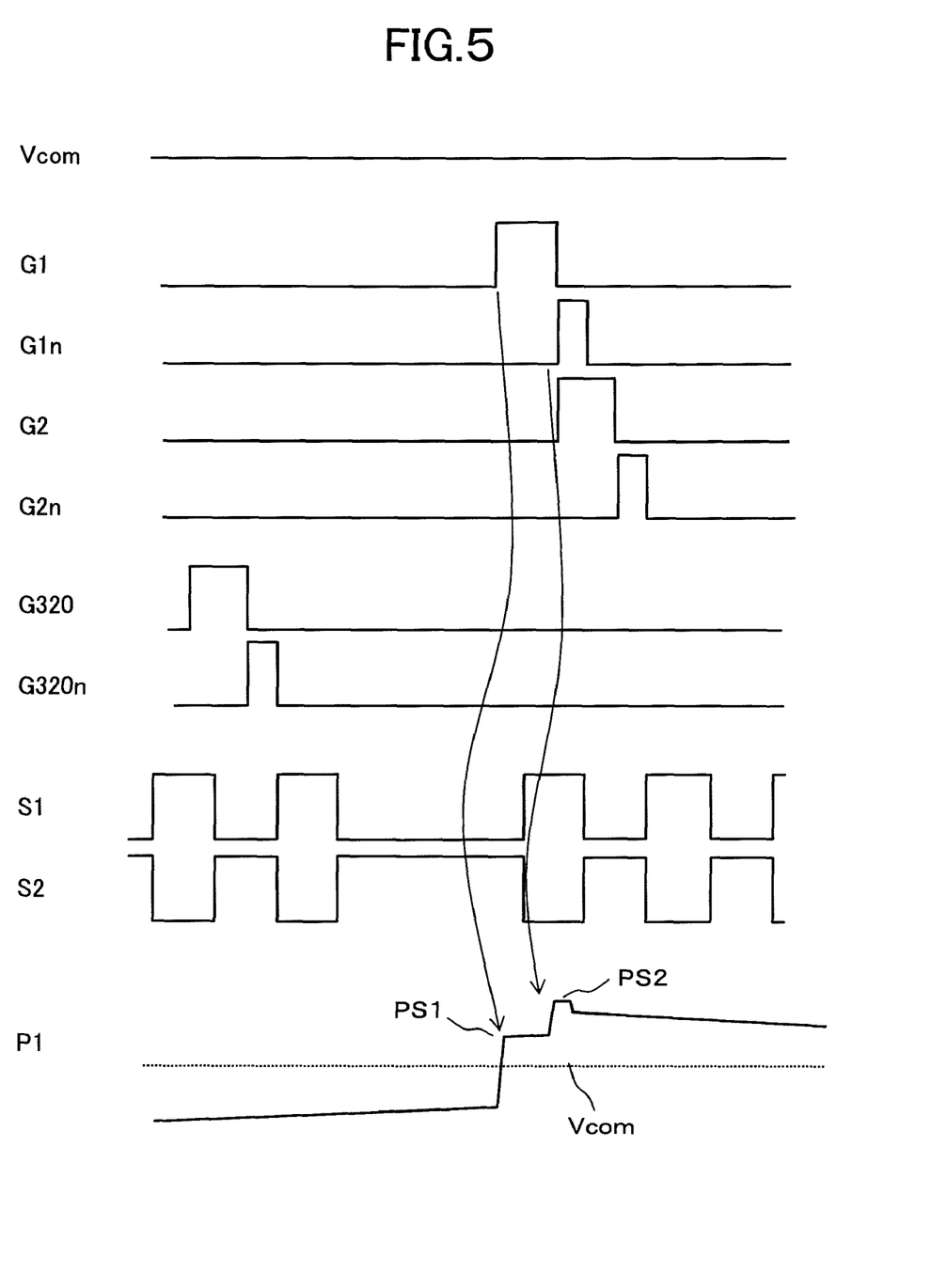
FIG. 5 is a timing chart showing the driving method of the liquid crystal display device of the embodiment according to the present invention.

Next, a circuit which forms a boosting scanning signal using a next-stage scanning signal is shown in FIG. 4. A fourth switching element 84 and a fifth switching element 85, and capacitances 93, 94 are added to the boosting circuit 10. Further, FIG. 5 shows a timing chart indicating a driving method of the circuit shown in FIG. 4.

First of all, in response to a scanning signal G1, the first switching element 81 and the third switching element 83 assume an ON state and hence, a video signal S1 is written in a pixel electrode 11-1 and one electrode of a boosting capacitance 91. Thereafter, after finishing of outputting of the scanning signal G1, the first switching element 81 and the third switching element 83 assume an OFF state.

However, in a state that the video signal S1 is succeedingly outputted, a scanning signal G2 of next stage is outputted. A sixth switching element assumes an ON state in response to the scanning signal G2 and hence, a boosting scanning signal G1$n$ in response to the scanning signal G2 is supplied to a control electrode of the second switching element 82.

However, with respect to the voltage of the control electrode of the second switching element 82, the capacitance 94 and a resistance are connected to a signal line 21-0 in parallel and hence, after the boosting scanning signal G1$n$ is supplied to the control electrode of the second switching element 82 for a fixed time, the voltage of the control electrode of the second switching element 82 approximates a voltage of the signal line 21-0.

By setting the voltage of the signal line 21-0 such that the second switching element 82 assumes an OFF state, it is possible to bring the second switching element 82 into an OFF state after bringing the second switching element 82 into an ON state for a fixed period in response to the boosting scanning signal G1$n$. Here, from the second stage and stages succeeding the second stage, in place of the signal line 21-0, the scanning signal line 21 of a preceding stage can be used.

Further, a capacitance 93 is connected to the signal line 21-0. After being charged in response to the scanning signal G1, when the scanning signal G2 is supplied to the pixel, the fifth switching element 85 assumes an ON state and the capacitance 93 discharges a stored charge to the signal line 21-0, and another electrode of the capacitance 94 is charged for a fixed time thus adjusting a time during which the second switching element 82 assumes an ON state.

Further, by outputting the video signal S2 after the second switching element 82 assumes an OFF state, the video signal S2 in accordance with display data is written in the second line pixels 11-2.

Figure 6:
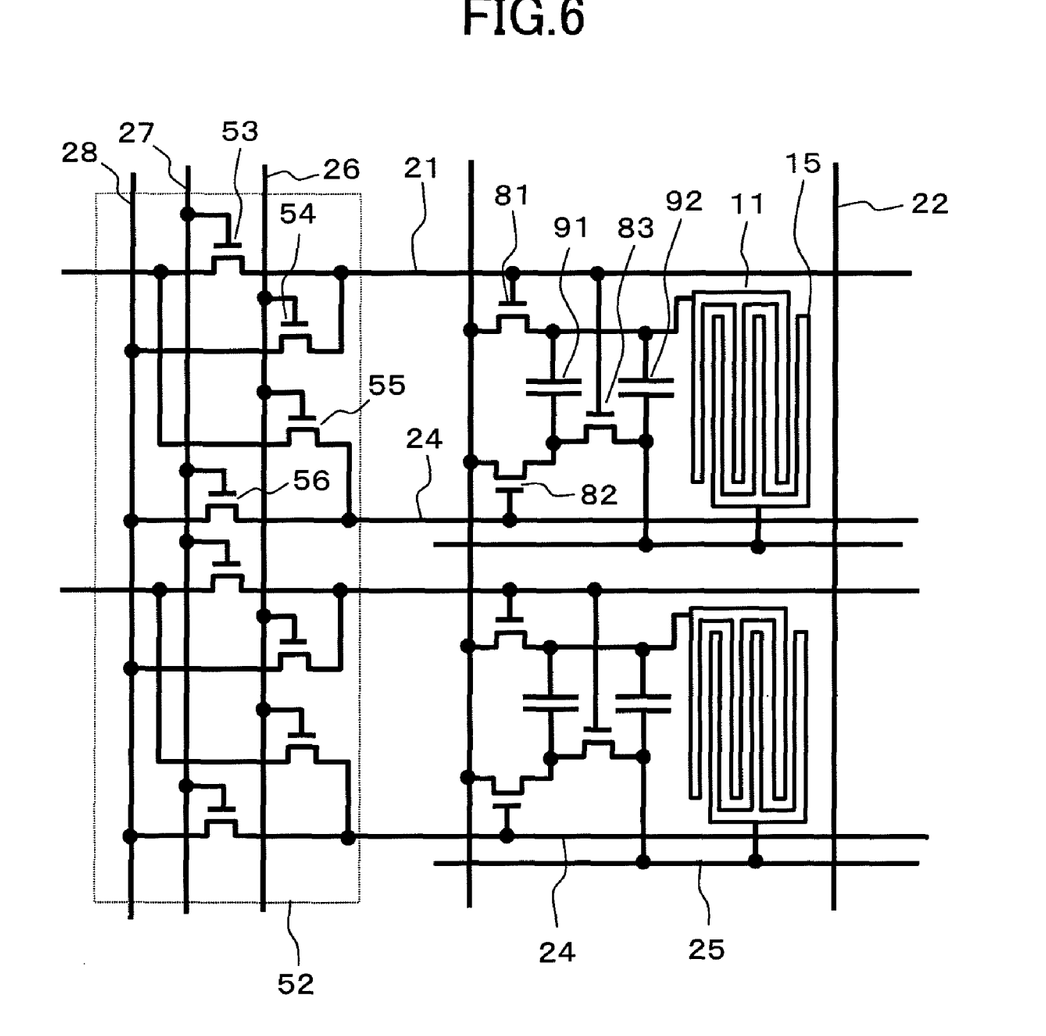
FIG. 6 is a schematic circuit diagram showing the pixel portions of the liquid crystal display device of the embodiment according to the present invention.

Next, FIG. 6 shows the constitution which provides the boosting line driving circuit 52 outside a display region. The boosting line driving circuit 52 is constituted of a first control switching element 53, a second control switching element 54, a third control switching element 55, a fourth control switching element 56, a first control signal line 26, a second control signal line 27, and an OFF voltage supply line 28.

Figure 7:
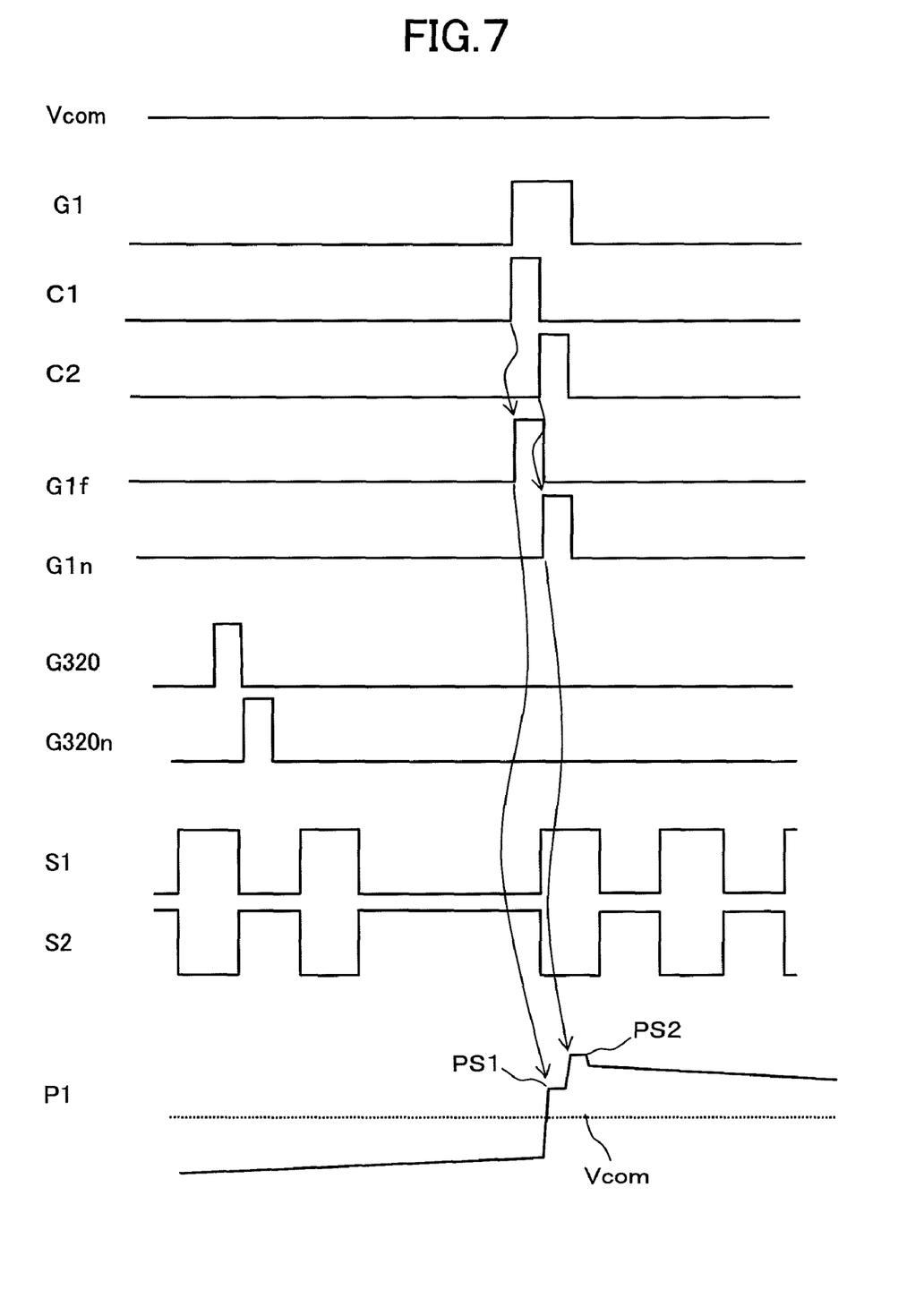
FIG. 7 is a timing chart showing the driving method of the liquid crystal display device of the embodiment according to the present invention.

Next, the manner of operation of the circuit shown in FIG. 6 is explained using a timing chart shown in FIG. 7. First of all, the scanning signal G1 is outputted from the scanning line driving circuit. Next, when a control signal C1 is outputted to the control signal line 27, the first control switching element 53 assumes an ON state and hence, a scanning signal G1$f$ is outputted to the scanning signal line 21.

When the scanning signal G1$f$ is outputted, the first switching element 81 assumes an ON state and hence, a video signal S1 is written in the pixel electrode 15 and one electrode of the boosting capacitance 91. At this point of time, the fourth control switching element 56 also assumes an ON state and the second switching element 82 assumes an OFF state.

Next, when outputting of the control signal C1 is stopped and a control signal C2 is outputted, the second switching element assumes an ON state and an OFF signal is outputted to the scanning signal line 21 and hence, a boosting scanning signal G1$n$ is outputted to the boosting scanning signal line 24.

When the boosting scanning signal G1$n$ is outputted, the second switching element 82 assumes an ON state and hence, a voltage of the pixel electrode 11 is boosted in response to the video signal.

Figure 8:
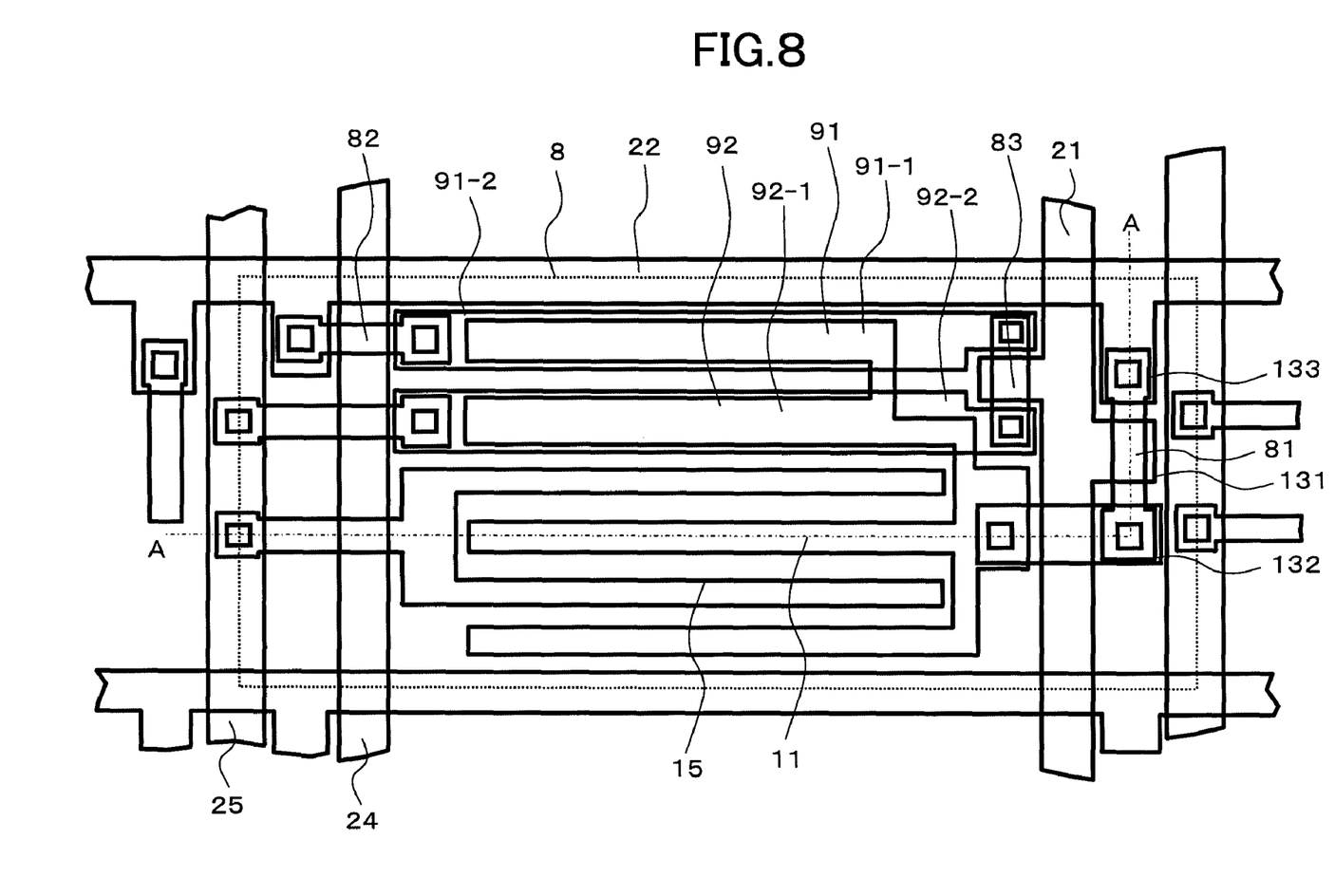
FIG. 8 is a schematic plan view showing the pixel portion of the liquid crystal display device of the embodiment according to the present invention.
Figure 9:
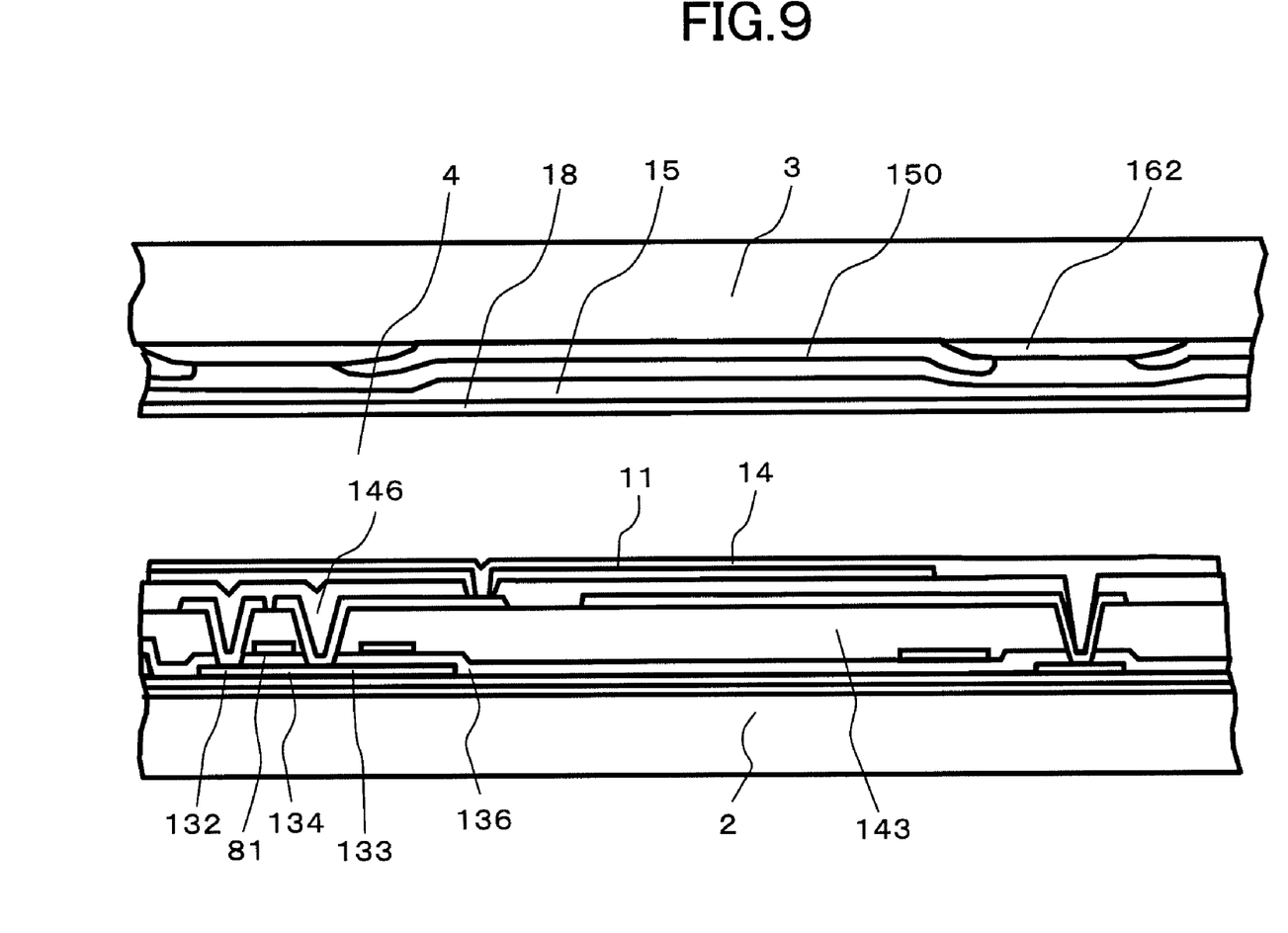
FIG. 9 is a schematic cross-sectional view showing the pixel portion of the liquid crystal display device of the embodiment according to the present invention.

Next, FIG. 8 is a schematic plan view of the pixel portion 8 provided with the boosting circuit 10. Further, FIG. 9 is a schematic cross-sectional view taken along a line A-A in FIG. 8.

As shown in FIG. 8, the first transistor 81 is provided for electrically connecting the video signal line 22 and the pixel electrode 11. The first transistor 81 assumes an ON state in response to the scanning signal so as to supply a video signal to the pixel electrode 11.

Further, a portion of the pixel electrode 11 extends to overlap with the holding capacitance 92 and the boosting capacitance 91 thus forming a first holding electrode 92-1 which constitutes one electrode of the holding capacitance 92 and a first boosting electrode 91-1 which constitutes one electrode of the boosting capacitance 91.

Further, the second transistor 82 controlled in response to a boosting scanning signal from the boosting scanning signal line 24 enables the electrical connection between the video signal line 22 and the second boosting electrode 91-2 which constitutes another electrode of the boosting capacitance 91.

The third transistor 83 is provided between the second holding electrode 92-2 which constitutes another electrode of the holding capacitance 92 and the second boosting electrode 91-2, and by controlling the third transistor 83 in response to the scanning signal from the scanning signal line 21, the electrical connection between the second holding electrode 92-2 and the second boosting electrode 91-2 can be established.

Further, in forming the second holding electrode 92-2 and the second boosting electrode 91-2 using an opaque metal film, it is necessary to form a light blocking film such that the light blocking film overlaps with the second holding electrode 92-2 and the second boosting electrode 91-2.

Further, the liquid crystal display panel 1 has the cross-sectional structure shown in FIG. 9, wherein the TFT substrate 2 and the color filter substrate 3 are arranged to face with each other. Between the TFT substrate 2 and the color filter substrate 3, liquid crystal composition 4 is held. Between peripheral portions of the TFT substrate 2 and the color filter substrate 3, a sealing material (not shown in the drawing) is formed. The TFT substrate 2, the color filter substrate 3 and the sealing material form an envelope or a container which defines a narrow gap therein, and the liquid crystal composition 4 is sealed between the TFT substrate 2 and the color filter substrate 3. Numerals 14 and 18 indicate alignment films which controls the alignment of the liquid crystal molecules.

Color filters 150 are formed on the color filter substrate 3 for respective colors of red (R), green (G) and blue (B), and a black matrix 162 is formed on boundaries between the respective color filters 150 for blocking light.

The TFT substrate 2 has at least a portion thereof made of transparent glass, a resin or the like. A background film is formed on the TFT substrate 2, and a semiconductor layer 134 formed of a polysilicon film is formed on the background film.

A gate insulation film 136 is formed on the semiconductor layers 134, and gate electrodes 131 are formed on the gate insulation film 136. Although the scanning signal lines 21 are formed on the TFT substrate 2 as described previously, a portion of the scanning signal lines 21 forms a gate electrode 131. The scanning signal line 21 is formed of a multi-layered film consisting of a layer mainly made of chromium (Cr) or zirconium and a layer mainly made of aluminum (Al). Further, side surfaces of the scanning signal line 21 are inclined such that a line width of the scanning signal line 21 spreads toward a lower surface of the scanning signal line 21 on the TFT substrate side from an upper surface of the scanning signal line 21.

Both end portions of the semiconductor layer 134 are doped with impurities so as to form a drain region 132 and a source region 133 in a spaced-apart manner. Although naming of "drain" and "source" is changed based on potentials as mentioned previously, in this specification, a region which is connected with the video signal line 22 is referred to as the drain region and a region which is connected with the pixel electrode 11 is referred to as a source region.

The video signal line 22 is formed of a multi-layered film which is formed by sandwiching a layer mainly made of aluminum (Al) between two layers mainly made of alloy of molybdenum (Mo) and chromium (Cr), molybdenum (Mo) or tungsten (W). Further, an insulation film 143 is formed so as to cover the first transistors 81. The source region 133 is connected with the pixel electrode 11 via a through hole 146 formed in the insulation film 143.

The insulation film 143 may be formed using an inorganic insulation film made of silicon nitride, silicon oxide or the like. The insulation film 143 may be also formed using an organic resin film. Although a surface of the organic insulation film may be formed in a relatively flattened shape, the surface may be formed of an uneven surface.

The pixel electrode 11 and the counter electrode 15 are formed of a transparent conductive film, and the transparent conductive film is formed of a light transmitting conductive layer made of ITO (Indium Tin Oxide), ITZO (Indium Tin Zinc Oxide), IZO (Indium Zinc Oxide), ZnO (Zinc Oxide), SnO (Tin Oxide), In2O3 (Indium Tin Oxide) or the like.

Further, the above-mentioned layer made of chromium may be made of a single body of chromium or alloy of chromium and molybdenum (Mo) or the like, the layer mainly made of zirconium may be made of a single body of zirconium or alloy of zirconium and molybdenum or the like, and the layer mainly made of tungsten may be made of a single body of tungsten or alloy of tungsten and molybdenum or the like, and the layer mainly made of aluminum may be made of a single body of aluminum or alloy of aluminum and neodymium or the like.

Figure 10:
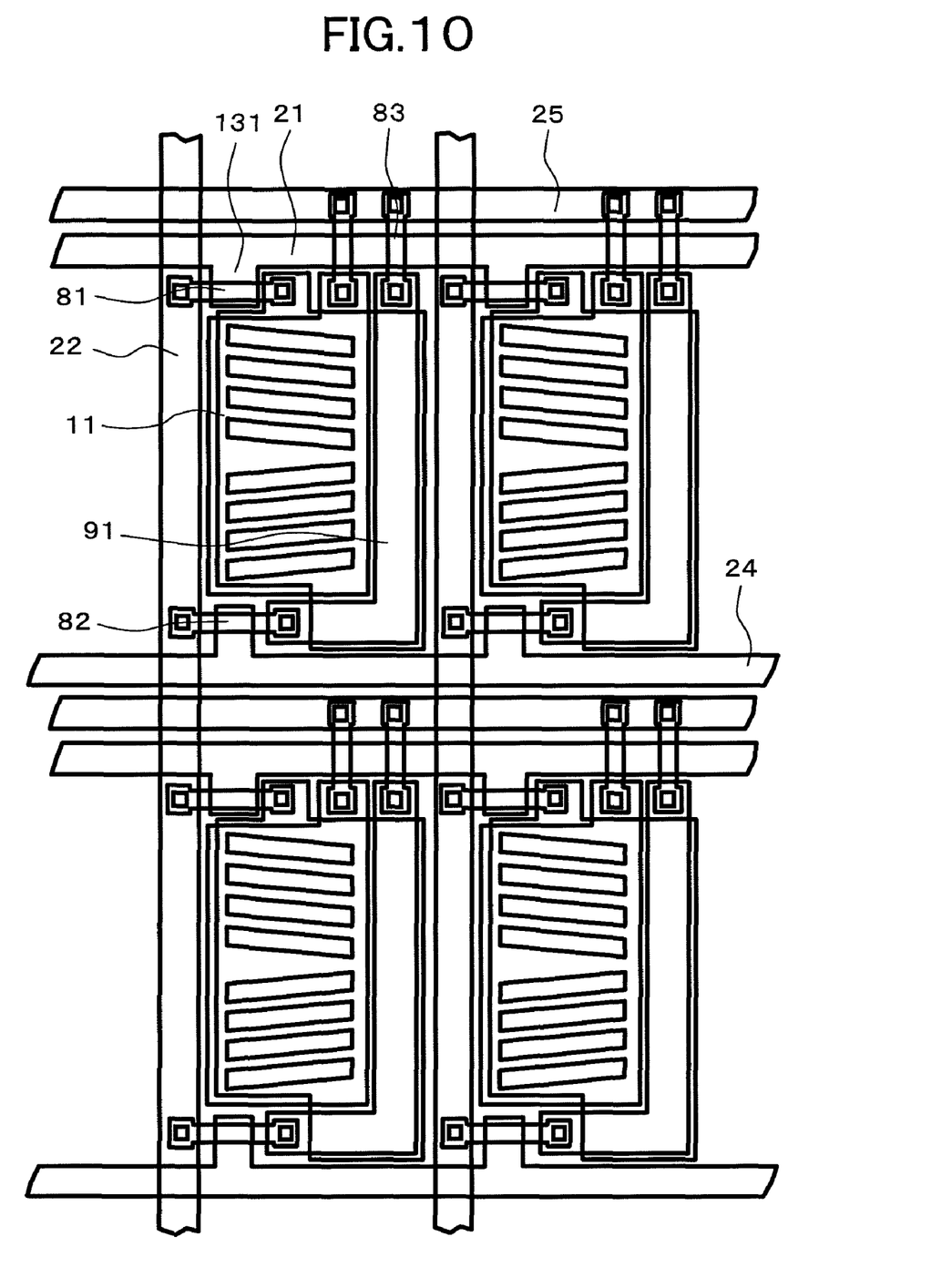
FIG. 10 is a schematic plan view showing the pixel portions of the liquid crystal display device of the embodiment according to the present invention.

Next, FIG. 10 shows the schematic pixel constitution which the counter electrode 15 is formed below the pixel electrode in a strip shape. By forming the counter electrode 15 below the pixel electrode 11, it is unnecessary to particularly form the holding capacitance 92 thus enabling the formation of the liquid crystal display panel 1 having the simple constitution.

What is claimed is:

1. A liquid crystal display device comprising:
   a first substrate;
   a second substrate;
   liquid crystal composition which is sandwiched between the first substrate and the second substrate;
   a plurality of pixels which are mounted on the first substrate;
   a pixel electrode which is provided to each pixel;
   a counter electrode which faces the pixel electrode;
   a boosting capacitance including a first capacitance electrode and a second capacitance electrode electrically connected to the pixel electrode;
   a first switching element supplying a video signal to the pixel electrode and the first capacitance electrode of the boosting capacitance in an ON state of the first switching element;
   a second switching element supplying a video signal to the second capacitance electrode of the boosting capacitance in an ON state of the second switching element;
   a video signal line supplying a video signal to the first switching element and the second switching element;
   a scanning signal line supplying a scanning signal for controlling turning on and off of the first switching element; and
   a boosting scanning signal line supplying a boosting scanning signal for controlling turning on and off of the second switching element, wherein
   the first switching element is brought into an ON state in response to the scanning signal so as to supply the video signal to the pixel electrode and the first capacitance electrode and, subsequently, the first switching element is brought into an OFF state and, thereafter, the second switching element is brought into an ON state so as to supply the video signal to the second capacitance electrode thus boosting or dropping a voltage of the pixel electrode.

2. A liquid crystal display device according to claim 1, wherein the liquid crystal display device further includes a third switching element which is brought into an ON state in response to the scanning signal so as to electrically connect the counter electrode and the second capacitance electrode with each other.

3. A liquid crystal display device according to claim 1, wherein the first switching element, the second switching element and the third switching element are formed within a pixel region which is surrounded by two neighboring video signal lines and two neighboring scanning signal lines.

4. A liquid crystal display device comprising:
   a first substrate;
   a second substrate;
   liquid crystal composition which is sandwiched between the first substrate and the second substrate;
   a plurality of pixels which are mounted on the first substrate;
   a pixel electrode which is provided to each pixel;
   a counter electrode which faces the pixel electrode and to which a common voltage is supplied;
   a boosting capacitance including a first capacitance electrode and a second capacitance electrode electrically connected to the pixel electrode;
   a first switching element supplying a video signal to the pixel electrode and the first capacitance electrode of the boosting capacitance in an ON state of the first switching element;
   a second switching element supplying a video signal to the second capacitance electrode of the boosting capacitance in an ON state of the second switching element;
   a third switching element supplying a common voltage to the second capacitance electrode of the boosting capacitance in an ON state of the third switching element;
   a video signal line supplying a video signal to the first switching element and the second switching element;
   a scanning signal line supplying a scanning signal for controlling turning on and off of the first switching element and the third switching element; and
   a boosting scanning signal line supplying a boosting scanning signal for controlling turning on and off of the second switching element, wherein the first switching element is brought into an ON state in response to the scanning signal so as to supply the video signal to the pixel electrode and the first capacitance electrode, the third switching element is brought into an ON state so as to supply a common voltage to the second capacitance electrode and, subsequently, the first switching element and the third switching element are brought into an OFF state and, thereafter, the second switching element is brought into an ON state so as to supply the video signal to the second capacitance electrode thus boosting or dropping a voltage of the pixel electrode.

5. A liquid crystal display device according to claim 4, wherein a boosting scanning signal is supplied from a boosting line driving circuit.

6. A liquid crystal display device according to claim 4, wherein the first switching element, the second switching element and the third switching element are formed within a pixel region which is surrounded by two neighboring video signal lines and two neighboring scanning signal lines.

\* \* \* \* \*